(12) United States Patent
Kitson et al.

(10) Patent No.: US 10,767,965 B2
(45) Date of Patent: Sep. 8, 2020

(54) ADAPTIVE CAMOUFLAGE DEVICE, SYSTEM, METHOD AND CAMOUFLAGE APPARATUS

(71) Applicant: BAE Systems plc, London (GB)

(72) Inventors: Stephen Kitson, Bristol (GB); John Rudin, Bristol (GB); Timothy Simon Taphouse, Bristol (GB)

(73) Assignee: BAE Systems plc, London (GB)

( * ) Notice: Subject to any disclaimer, the term of this patent is extended or adjusted under 35 U.S.C. 154(b) by 234 days.

(21) Appl. No.: 15/528,423

(22) PCT Filed: Nov. 11, 2015

(86) PCT No.: PCT/EP2015/076341
§ 371 (c)(1),
(2) Date: May 19, 2017

(87) PCT Pub. No.: WO2016/078987
PCT Pub. Date: May 26, 2016

(65) Prior Publication Data
US 2017/0336173 A1    Nov. 23, 2017

(30) Foreign Application Priority Data
Nov. 19, 2014 (GB) .................................. 1420557.9

(51) Int. Cl.
*F41H 3/00* (2006.01)
*F41H 3/02* (2006.01)
*G02F 1/1333* (2006.01)
*G02F 1/137* (2006.01)
*G02F 1/1335* (2006.01)

(52) U.S. Cl.
CPC ................. *F41H 3/02* (2013.01); *F41H 3/00* (2013.01); *G02F 1/13725* (2013.01); *G02F 1/133305* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 6,163,348 A | * | 12/2000 | Izumi ..................... G02F 1/135 348/751 |
| 6,338,292 B1 | | 1/2002 | Reynolds et al. |
| 2007/0190368 A1 | | 8/2007 | Jung et al. |
| 2009/0201436 A1 | | 8/2009 | Strazzanti |
| 2011/0290296 A1 | | 12/2011 | Daniel et al. |
| 2012/0148797 A1 | | 1/2012 | Tsai |

(Continued)

FOREIGN PATENT DOCUMENTS

| | | |
|---|---|---|
| EP | 1372023 A2 | 12/2003 |
| GB | 2362283 A | 11/2001 |
| JP | H11064831 A | 3/1999 |

OTHER PUBLICATIONS

International Patent Application No. PCT/EP2015/076341, Search Report and Written Opinion dated Feb. 8, 2016, 20 pgs.

(Continued)

*Primary Examiner* — Reginald S Tillman, Jr.
(74) *Attorney, Agent, or Firm* — Maine Cernota & Rardin

(57) ABSTRACT

An adaptive camouflage device that includes at least one non-emissive layer which includes a guest-host liquid crystal (GHLC).

21 Claims, 17 Drawing Sheets

(56) References Cited

U.S. PATENT DOCUMENTS

2013/0258266 A1  10/2013  Sukhomlinova et al.

OTHER PUBLICATIONS

United Kingdom Patent Application No. GB1420557.9, Search Report dated Dec. 12, 2014, 3 pgs.
Mallia, V. Ajay and Tamaoki, Nobuyuki, Design of chiral dimesogens containing cholesteryl groups; formation of new molecular organizations and their application to molecular photonics, The Royal Society of Chemistry 2004, Jan. 19, 2004, Chem. Soc. Rev., vol. 33, pp. 76-34.

* cited by examiner

900

(a)

901

(b)

ADAPTIVE CAMOUFLAGE DEVICE, SYSTEM, METHOD AND CAMOUFLAGE APPARATUS

CLAIM OF PRIORITY

This application is a U.S. National Stage Filing under 35 U.S.C. 371 from International Application No. PCT/EP2015/076341, filed on Nov. 11, 2015, and published as WO 2016/078987 A1 on May 26, 2016, which claims the benefit of priority to United Kingdom Patent Application No. 140557.9, filed on Nov. 19, 2014, each of which is hereby incorporated by reference herein in its entirety.

TECHNICAL FIELD

Aspects relate, in general, to an adaptive camouflage device, system, method and a camouflage apparatus.

BACKGROUND

Camouflage, in which any combination of techniques, materials, coloration or illumination and so on, is used to conceal or disguise an object or individual is widespread. For example, military personnel may use clothing with disruptive patterns that break up a wearer's outline, and similar disruptive patterns can be used on objects such as vehicles.

Military operations commonly require moving between different terrains—for example between rural and urban settings. Choosing a camouflage system will inevitably be a compromise between the different terrains, which may result in personnel and equipment being more exposed than may be desired.

SUMMARY

According to an example, there is provided an adaptive camouflage device that includes at least one non-emissive layer, which includes a guest-host liquid crystal (GHLC). The device can include a reflector layer or reflector. The reflector layer can be partially transparent over at least a portion thereof. The device can be devoid of reflector layer over at least a portion thereof. The portion devoid of reflector layer or which is partially transparent can be arranged to be mounted atop or over a window, or other transparent or semi-transparent opening, lens, or sensor. The guest-host liquid crystal can be provided between a pair of plastic substrates. Respective ones of the substrates can be coated with a transparent conductor. The or each conductor can be patterned. At least one of the plastic substrates can be transparent. At least one of the plastic substrates can be semi-transparent. The device can include multiple spacers positioned between the substrates, whereby to define a cavity between the spacers within which the GHLC is provided. The reflector can be a diffuse reflector. The or each non-emissive layer can be operable to be switched between multiple colours or hues. At least one of the colours or hues can be outside the visible spectrum. One of the colours or hues can be in the infra-red region of the spectrum. The device can include two non-emissive layers, each layer including GHLC containing respective different colour dye or blend of dyes. The device can include a filter layer.

The filter layer can absorb part of the visible spectrum, whereby to tint the camouflage device. The filter layer can absorb part of the infra-red spectrum, whereby to tint the camouflage. The device can include an anti-reflective coating. The device can include at least one emissive source. The or each emissive source can be a source of visible light. The visible light can be white light, or any other selected or desired colour and brightness and so on. The or each emissive source can be a source of infra-red light. The or each source can be of a selected colour and/or brightness and/or is a source of white light. The or each source can be positioned or otherwise provided behind the GHLC layer such that the emitted light passes through the layer. The device can be in the form of a tile of a selected shape and/or size and/or profile. The device can be straight, curved or curvilinear or have an irregular profile. The device can be arranged or profiled to be applied directly to the surface of a platform. The device can form part of a mesh that is adapted to be applied to or otherwise provided on or in proximity to a surface of a platform. The device can include or use a renewable energy source operable to supply energy for the device. The renewable energy source can include one or more photo-voltaic (PV) panels. The or each PV panel can be integrated with or otherwise integral to the device. The device can harvest energy from excess heat generated by a platform to which the device is mounted, attached or affixed. The device can be switched between preset patterns by an operator or automatically.

According to an example, there is provided an adaptive camouflage system, comprising one or more devices as claimed in any preceding claim stacked or arranged together to form a composite device. The system can include an imaging device operable to detect the scene and/or background and/or colour and/or brightness and/or hue of at least a portion of the environment in which the system is positioned, and to generate data representing the same. The system can include an image analysis system operable to process the data and select, on the basis of the scene and/or background and/or colour and/or brightness and/or hue a colour and/or hue and/or brightness and/or pattern for the devices. The system can include a location detecting apparatus and a system operable to process the data and select, on the basis of location, a colour and/or hue and/or brightness and/or pattern for the devices. Portions of respective ones of the stacked devices can be shared with other devices in the system. Respective ones of the devices of the system can include a GHLC layer including respective different dyes or dye mixtures. Respective ones of the devices of the system can be individually controllable and/or addressable. At least one of the devices of the system can include a GHLC layer including a dye or dye mixture operable to absorb light outside of the visible part of the spectrum. Multiple devices can be arranged adjacent to one another whereby to form a composite device forming a camouflage pattern.

According to an example, there is provided a method for controlling the visible and non-visible signature of an object or individual, the method comprising providing a device or system as provided herein to be affixed, attached to or otherwise associated with the object or individual, and configuring the device or system to provide a selected colour and/or hue and/or brightness. Configuring the device or system can include determining the location of the object or individual, and selecting the colour and/or hue and/or brightness in accordance with a preset relating to the location. Configuring the device or system can include selecting a colour and/or hue and/or brightness for the object or individual in accordance with a time value.

According to an example, there is provided a camouflage apparatus, comprising multiple tile regions arranged adjacent to one another to form a camouflage pattern for the apparatus, respective ones of the tile regions comprising a device or an addressable part of a device that includes at least one non-emissive layer which includes a guest-host liquid crystal. Respective ones of the tile regions can be switchable between multiple states whereby to alter or adjust a colour or hue of the regions.

BRIEF DESCRIPTION OF THE DRAWINGS

Embodiments will now be described, by way of example only, with reference to the accompanying drawings, in which.

DESCRIPTION

Figure 1:
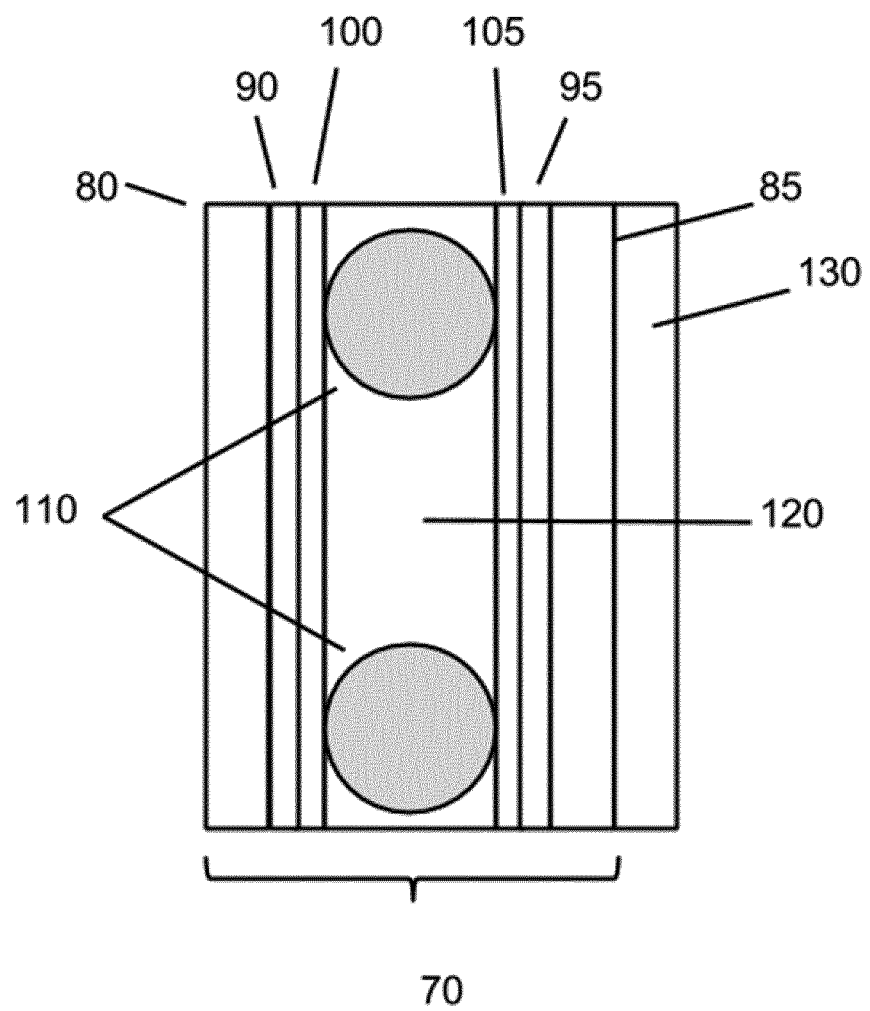
FIG. 1 is a schematic representation of a cross-sectional view of a portion of a plastic camouflage device according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

According to an example, there is provided an adaptive camouflage system that is operable to switch between a range of colours, hues or vary or modify a brightness level to better match the surroundings, providing better cover and therefore giving armed forces, for example, a tactical advantage.

In an example, camouflage can be manually switched between a number of preset colours and patterns to choose a setting that matches the environment. For example, so-called Berlin camouflage might be used in an urban setting and Disruptive Pattern Material in a rural terrain.

The camouflage system can include an imaging device such as a camera and an image analysis system to automatically determine a camouflage setting, such as a suitable setting for the immediate environment in which the individual or object is located.

Previous approaches to adaptive camouflage have largely relied on emissive systems such as conventional display systems, or arrays of LEDs attached to the surface of a vehicle for example, partly because reflective colour systems are very difficult to make efficient enough. The colour and brightness of the light sources are set to match the background. However, because they are emitting light, such systems are power hungry, and can also be bulky and fragile, especially if based on conventional glass display panels.

According to an example, a camouflage system is reflective rather than emissive, so that it has much lower power consumption. Furthermore, being reflective means that it responds to changing illumination in the same way as the surroundings, further enhancing its effectiveness as camouflage.

The system can be fabricated from thin plastic, so is robust and light. A plastic camouflage device according to an example can be constructed as a tile of any desired shape that can be applied to the surface of the vehicle or equipment that requires camouflage (referred to hereinafter generally as a platform). In an example, the whole surface can be covered by an array of tiles adhered or otherwise attached (such as removably attached) to the surface. Alternatively, a portion of the surface of the platform can be covered by such tiles. The device can be integrated into a camouflage net or mesh system that is placed over the platform for example.

Each tile can be a component of a camouflage pattern. For example, a camouflage pattern can be formed from multiple regions of different size and shape that are arranged adjacent to one another in order to form the overall pattern. In an example, respective ones of the regions can be formed from one or more tiles. Each tile can be configured to be switchable between multiple reflective states, as described in more detail below, in order to enable the camouflage pattern to be modified or adapted as desired. Tiles that make up a pattern may overlap. That is, multiple tiles forming respective pattern regions may overlap. In an example, specific colour combinations can be selected to enable useful colour gamuts for camouflage purposes. For example, one tile of a pattern be one colour and one or more adjacent tiles may be another colour. In an example, the tiles are intended to be large enough that they are discerned as a pattern.

FIG. 1 is a schematic representation of a cross-sectional view of a portion of a plastic camouflage device according to an example. The device 70 includes two transparent plastic substrates 80, 85. On the outer surface of one of these substrates is reflector 130. The reflector can be made using a number of techniques known in the art. For example, it may be a metallic film coated directly onto the substrate, or it may be a separate layer adhered to the substrate for example. The reflector 130 diffusely reflects light. This can be achieved for example by texturing the metallic surface or roughening the outer surface of substrate 85 before applying a metallic film. In use, the camouflage device 70 can be attached to the platform with the reflector 130 in contact with the surface of the platform. The top surface is therefore the outer surface of substrate 80. Light is incident on that layer, passes through the other layers and is reflected by the reflector 130, back through the other layers and out to the environment.

In an example, each substrate (80 and 85) is coated with a transparent conductor (90 and 95). There are a variety of transparent conductors that could be used. For example, a metal oxide such as indium tin oxide, or an organic conductor such as graphene or pEDOT:pSS or a layer composed of metallic nanoparticles such as silver nanowires can be used. The conductive layers are patterned and connected to an external circuit (not shown) to allow an electric field to be applied across a Guest Host Liquid Crystal (GHLC) layer (120). In an example, the gap between the substrates can be set by spacers 110, which can be rigid polymer or glass spacer beads for example, but spacing may also be provided using photo-patterning techniques as is known in the art. In an example, the gap is typically 5-10 um, but may vary from 1-100 um for example as desired. The device 70 thus includes a non-emissive layer which includes a GHLC.

In an example, the reflector 130 may be placed on one of the inner surfaces of the transparent plastic substrates 80, 85. This can have the advantage of increasing the reflectivity of the camouflage device as light no longer has to pass through one of the substrates and any adhesive between the substrate and the reflector. These layers can be slightly absorbing or scattering which reduces the amount of light reflected from the device. Optionally the reflector may be itself conductive and used in place of one of the transparent conductors 90, 95. This may have the advantage of reducing the cost. The reflector can be made using a number of techniques known in the art. The reflector can be diffuse, and this can be achieved for example by texturing the metallic surface or roughening the inner surface of substrate 85 before applying a metallic film.

The Guest-Host Liquid Crystal (GHLC) acts as a switchable absorber. In an example, it consists of a nematic liquid crystal (LC) doped with a small amount of dichroic dye or pigment. Typically 1-10% of dye (by weight) can be used. The LC consists of rod shaped molecules that tend to align in a common direction, and tend to align the dye molecules dissolved in it. The initial zero field alignment direction is determined by applying suitable alignment layers (100 and 105) onto the transparent electrodes. The alignment direction of the GHLC can then be changed by applying an electric field across a thin (typically 5-10 micron) layer of the fluid. Depending on the nature of the LC, the rod shaped molecules tend to rotate to either align with the applied field, or rotate to align perpendicular to the field. A GHLC device is designed so that in one state or configuration the molecules are aligned end-on to the viewer. This alignment minimises the absorbance of light incident on the layer, so that it appears light. In a second state or configuration the molecules are aligned side-on to the viewer which maximises the absorbance so that it appears dark. Typically a device can adopt configurations between these extremes and is switched by modulating an applied voltage.

In an example, the GHLC layer can be adapted to cause both polarisations of incident light to be absorbed, as known to one skilled in the art. For example, a chiral component can be added to the LC so that it adopts a twisted configuration so that when the molecules are aligned side on, molecules are presented at a range of alignment directions. Another option is to include a suitable waveplate between the display layer and the reflector. According to an example, patterning of the transparent electrodes (conductors) can enable different voltages to be applied to different areas of a device so that a device can display a desired pattern of light and dark regions.

The colour of the camouflage device is determined by the choice of the dye or dyes added to the LC. A combination or mixture of dyes can be used to obtain a desired colour. Changing the voltage applied to the device will change the absorbance of the layer and hence the saturation of the colour. For example, a green dye may be used—that is a dye that absorbs blue and red light to transmit only green light. Applying a voltage will then switch the device between a dark green and a light green.

The colour can be further controlled by adding a fixed filter to the device. For example, a coloured transparent film can be added to the outer surface of substrate 80 or between the substrate 85 and reflector 130. The filter can be chosen to absorb part of the incident light. The combination of the filter spectrum with the dye spectrum determines the overall colour.

Either the filter or the dye can be chosen to absorb visible or non-visible light. Choosing to absorb visible light will generate a visible colour, for example green, brown or grey. An example of non-visible light would be infra-red (IR) which one might choose to enable control over the IR signature of a platform.

In an example, a device may form a region of a multi-region camouflage pattern in which each region is a different colour, shade or hue. Thus, an overall pattern can be composed of multiple devices forming respective different tiles, each of which can be individually modified or configured in order to vary the camouflage pattern. Alternatively, a pattern can be formed from a single device in which individual areas of the pattern are individually controllable using a patterned electrode as noted above, whereby to enable the regions to be modified to adjust the overall effect of the pattern.

Figure 2:
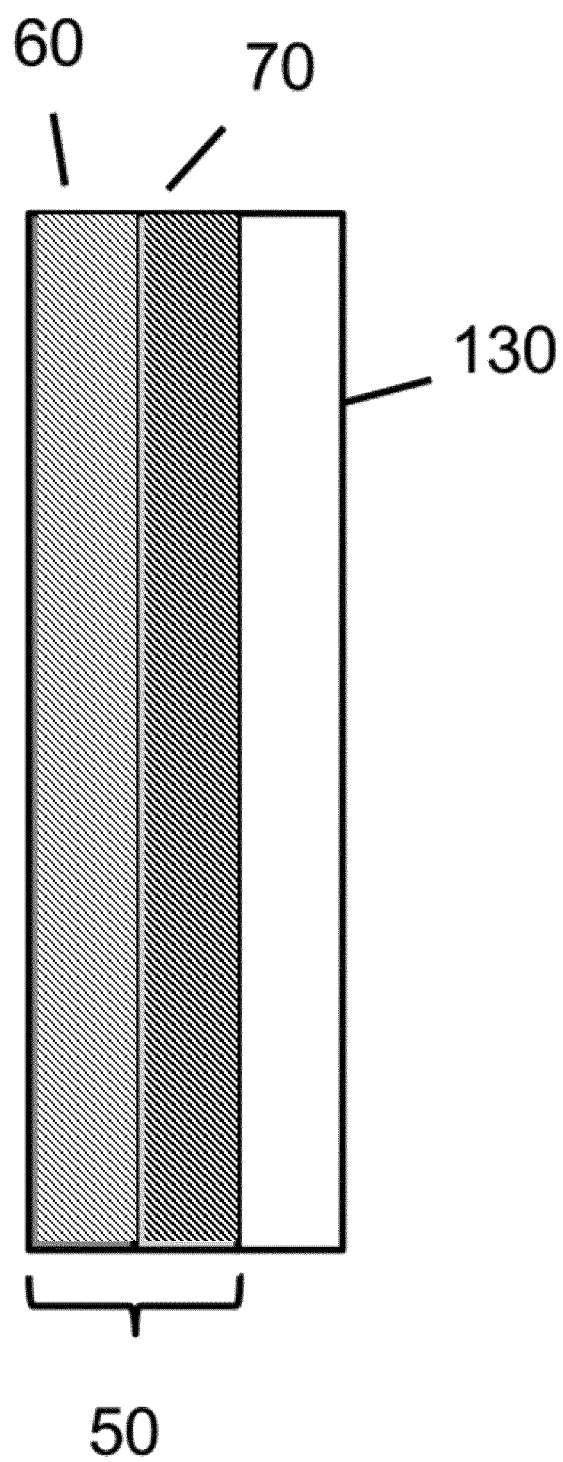
FIG. 2 is a schematic representation of a cross-sectional view of a portion of a plastic camouflage device according to an example.
Figure 3:
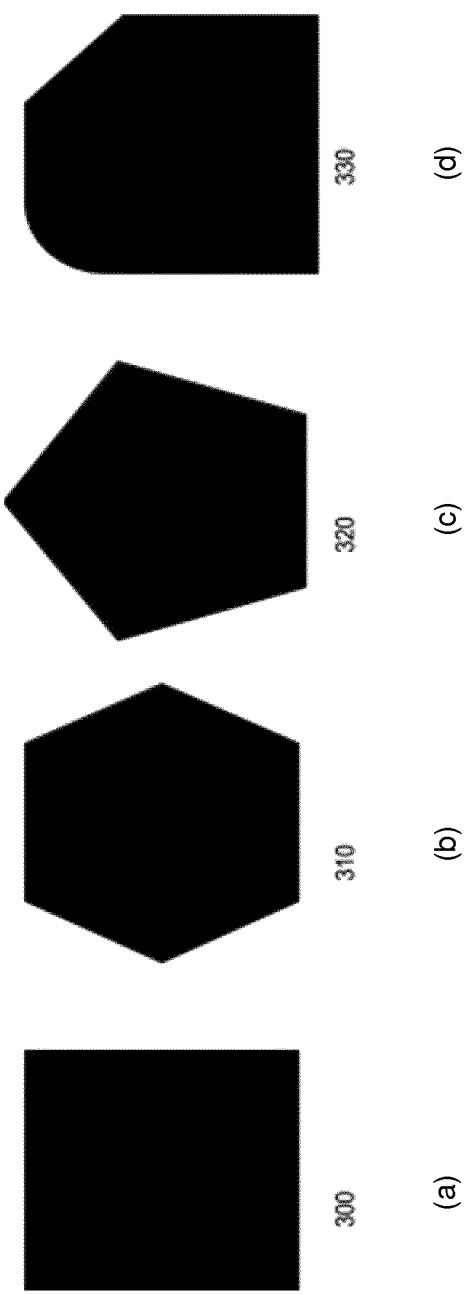
FIGS. 3a-d schematic representations of various tile shapes according to an example.

FIG. 2 is a schematic representation of a cross-sectional view of a portion of a plastic camouflage device according to an example. In the example of FIG. 2 there are two separate GHLC layers, each with different absorbance spectra. Two camouflage devices (60 and 70) as described above with reference to FIG. 1 can be provided and stacked on top of each other (50) as shown. The devices 60, 70 are the same as described with reference to FIG. 1. In the case of two stacked devices as described with reference to FIG. 1, the reflector 130 is omitted from one of the devices.

A reflector 130 is applied to the rear surface, which is the surface that is to be adhered or otherwise attached to the surface of a platform to be camouflaged for example. It will be appreciated that, similar to the layers described above with reference to FIG. 1, the choice of the front and rear of the device is not intended to be limited to that shown. It will be apparent that it is equally possible to have reflector placed in relation to layer 60 for example, such that the other side of the device as shown becomes the rear of the device. Similarly with reference to the device as shown in FIG. 1, it will be appreciated that the layers, particularly the reflector 130, can be arranged so that the side of the device with layer 80 has the reflector thereon, thereby making that side the rear of the device.

In an example, a clear adhesive may be used to attach the devices 60 and 70 together. In some examples 60 and 70 may share a substrate. That is, the top substrate (80) of device 70 may be the bottom substrate of device 60 for example.

According to an example, each device (60 and 70) includes a GHLC layer, but can include different coloured dyes. This allows for selection of a wider colour gamut for the camouflage device. Each layer can be used to independently control a given waveband of light so that a wide range of colours can be achieved. In an example, one of the dyes can be chosen to absorb light outside the visible spectrum (for example the infra-red) so that both visible and non-visible signatures can be controlled. As described above, a fixed filter can also be included to further modify the colours.

In an example, similarly to that described with reference to FIG. 2, a device can include three or more GHLC layers stacked or otherwise arranged on top of, adjacent or next to each other, each with a different colour dye in the GHLC layer for example, with or without common substrate(s), and with or without one or more filters as described above. That is, a camouflage device can comprise two or more stacked devices as described with reference to FIG. 1 stacked together, optionally including one or more common substrate portions or layers.

In an example of a device with three stacked camouflage devices, one dye can be yellow, one can be magenta and one can be cyan so that blue, green and red light can all be controlled independently, allowing a wide range of colours to be displayed. As before, one of the layers could instead be chosen to absorb nonvisible light, for example to control an IR signature of the platform (or a portion thereof) to which the device is affixed, attached or provided on.

As noted, more layers can be used. For example a four layer device could have three GHLC layers chosen to modulate visible light and one to modulate IR for example. Other alternatives are possible.

According to an example, a device can include a light source. The provision of a light source can be advantageous for example, if the platform is silhouetted against a bright sky. The light sources might be, for example, LEDs embedded into the top surface. Alternatively, they might be behind the camouflage device, emitting light through a hole in the reflector 130 for example. Alternatively, the reflector 130 can be semi-transparent so that the light from the light source or sources shines through the reflector. The light sources can be visible or non-visible light, for example IR.

According to an example, the camouflage device can tile the surface of the platform. The devices may be irregular shapes and/or they may be curved or otherwise profiled for example. Tiles can have a variety of shapes, which can be chosen to match the shape and size of the surface onto which they are mounted.

FIGS. 3*a*-*d* are schematic representations of various tile shapes that can be selected according to an example. For example they may be square (300), hexagonal (310) or pentagonal (320). Combinations of hexagons and pentagons may be used to cover curved surfaces for example. The tiles may also be irregular (330), with curved edges to fit round surface features. It will be appreciated that other shapes may be selected, and that those depicted are only some examples of possible shapes that may be employed.

Figure 4:
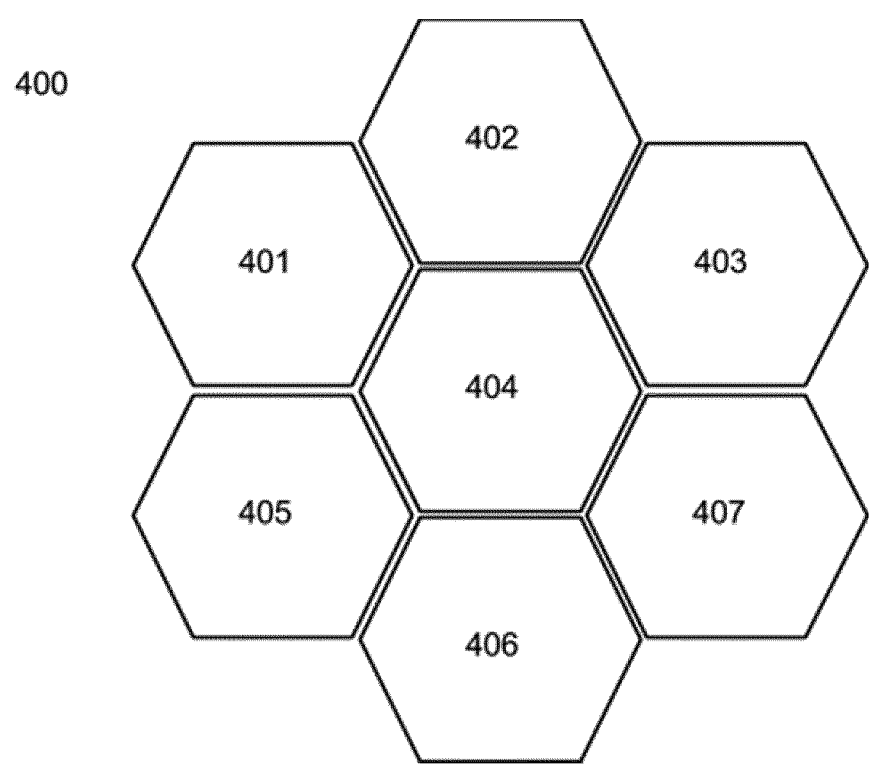
FIG. 4 is a schematic representation of an array of tiles according to an example.

Tiles can be arranged in close packed arrays. FIG. 4 is a schematic representation of an array of tiles according to an example. The tiles (401-407) are arranged in an array (400). As such, the array 400 can be used to cover the surface of a platform for example.

Figure 5:
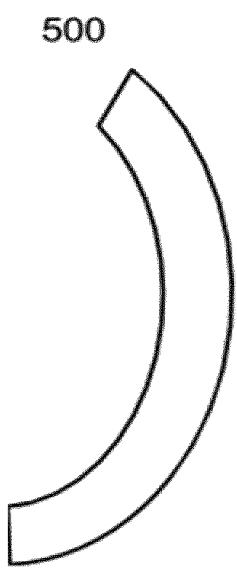
FIG. 5 is a schematic representation of a cross-sectional view of a tile according to an example.

FIG. 5 is a schematic representation of a cross-sectional view of a tile according to an example. In the example of FIG. 5 a curved tile (500) is shown in profile. As shown with reference to FIG. 5, a tile can thus be curved, which can enable it to better fit the surface of a platform for example.

Accordingly, as noted above, each tile can be a component of a multi-region camouflage pattern in which each region is a different colour, shade or hue. An overall pattern can be composed of multiple devices forming respective different tiles, each of which can be individually modified or configured in order to vary the camouflage pattern. Alternatively, respective tiles can be different regions of a device that are individually controllable using, for example, a patterned electrode as noted above.

A camouflage device may also be designed to be part of a mesh or net to cover a platform. The device may again be designed to form irregular shapes and/or curved or profiled to break up the outline of the platform, or even to simulate natural textures such as leaves and so on. An example of a platform with a mesh or net according to an example is depicted schematically in FIGS. 14 and 15, discussed in more detail below.

In an example, the devices use a voltage to operate. That voltage may be provided by the platform, or the devices may harvest their own energy from the environment. For example, the devices might incorporate a small area of photovoltaic cells to convert sunlight into electricity, or may be able to use a device to convert movement of the platform to energy, or may be able to use a device to convert heat, or flow of heat into electricity. In an example, a photovoltaic cell may be integral to the construction of the device. In a further example, the energy may be harvested from the excess heat of the underlying platform.

An advantage of the GHLC device is that it does not scatter light, it just changes its absorbance. Therefore in an example, part of the camouflage device can have the reflector 130 removed from the back surface. This then allows the camouflage device to cover a window through which a person or a sensor can view the scene or environment whilst the camouflage device makes them less visible.

In an example, the front surface of a device can include an anti-reflection layer and/or texturing it to reduce or eliminate reflections such that there are no 'glints' from the surface. That is, the surface of the camouflage system may be treated or coated so as to reduce reflections or glints from the surface. For example, in the field or generally in use, any specular reflections from the surface of a platform or individual may make it/them stand out. In an example, low reflectivity from the surface of the plastic can be obtained by applying a thin film coating, or a micro-structured texture. The surface may also be textured to give a matte finish.

Figure 6:
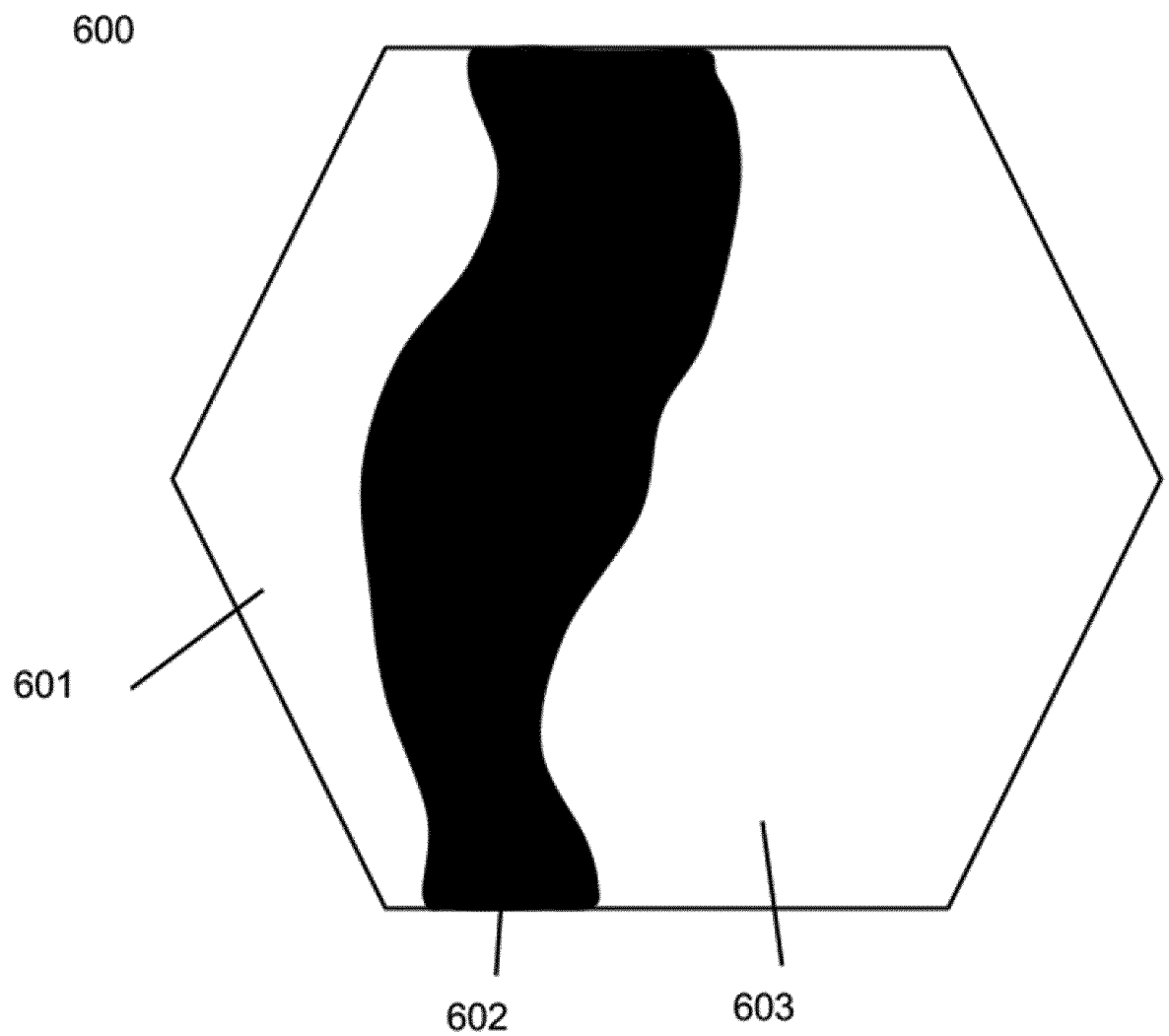
FIG. 6 is a schematic representation of a patterned tile according to an example.

As noted above, a tile can include patterned electrodes so that discrete parts can be switched to different shades or colours. FIG. 6 is a schematic representation of a patterned tile according to an example. The tile 600 has patterned electrodes that allow 3 parts to be independently switched. In the example of FIG. 6, parts 601 and 603 can be switched into a light state. Part 602 can be switched into a darker state. The shapes of the patterned areas could be designed to mimic natural textures or could be regular shapes. It is to be understood that each tile could have any number of switchable elements, and that the number and design of the elements could vary between tiles.

Figure 7:
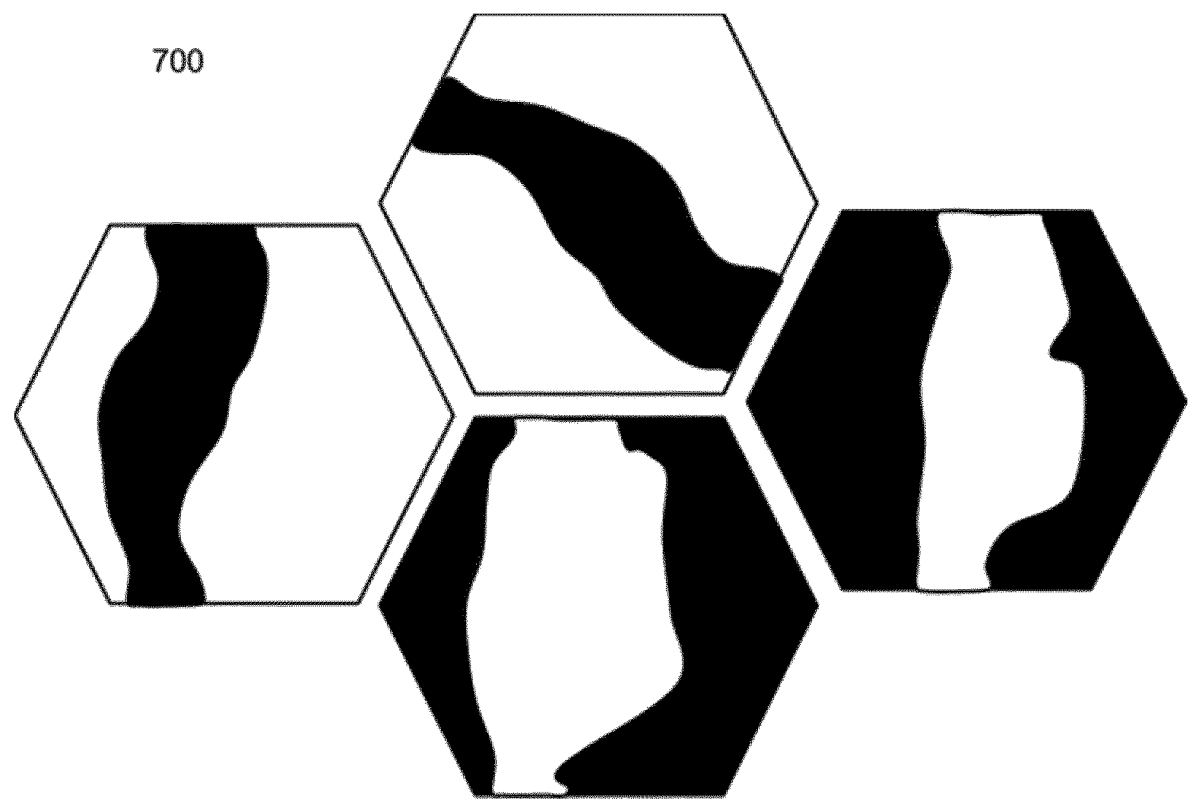
FIG. 7 is a schematic representation of an array of patterned tiles according to an example.

For example, with reference to FIG. 7, which is an array of patterned tiles according to an example, the array 700 includes multiple tiles with respective different patterns. In an example, each tile can be switched independently, so that the light and dark portions of each tile as shown can be changed as desired independently of the portions of the other tiles of the array 700.

Figure 8:
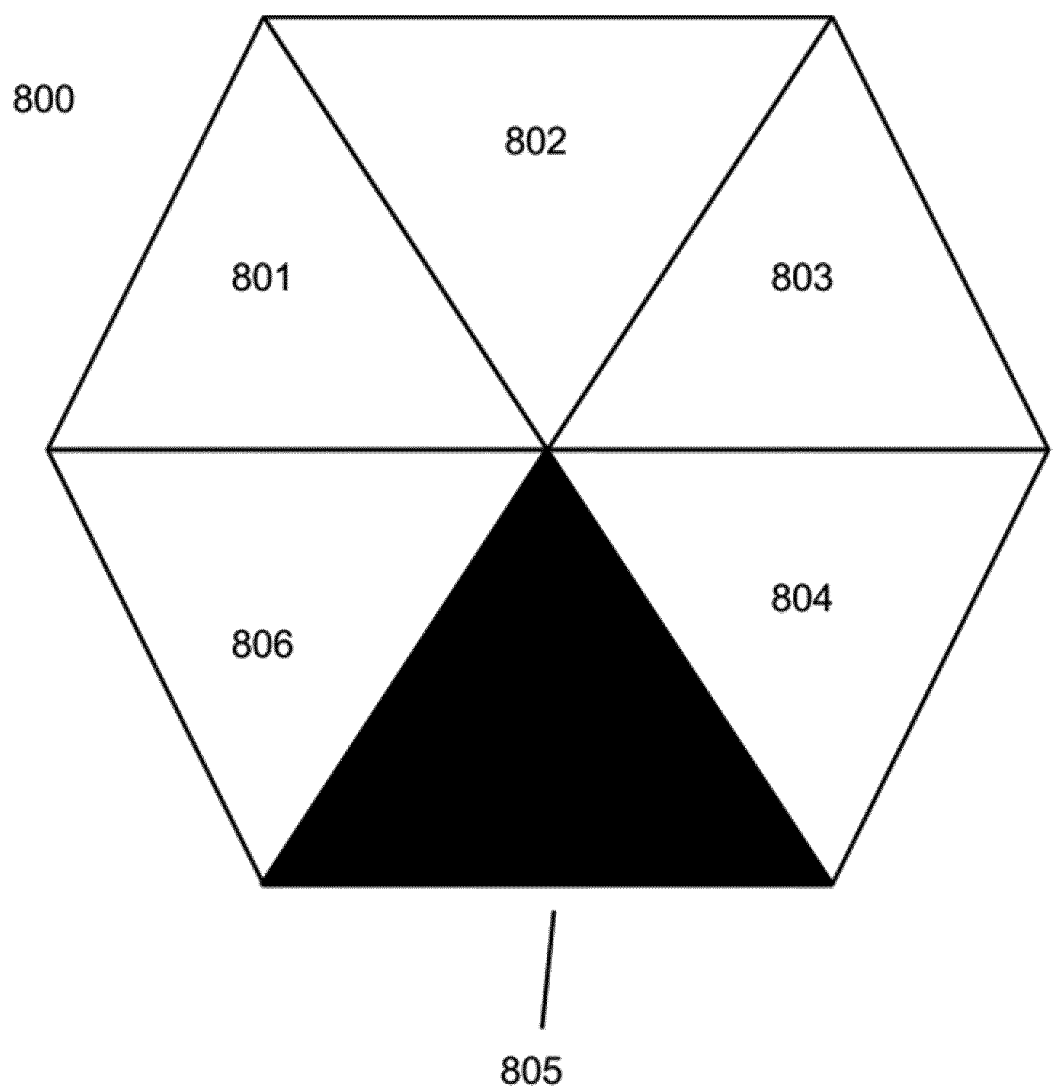
FIG. 8 is a schematic representation of a patterned tile according to an example.

A tile may also have electrodes patterned with regular shapes. FIG. 8 is a schematic representation of a patterned tile according to an example. In the example of FIG. 8, a hexagonal tile (800) is divided into triangles 801-806, each of which can be independently switched as desired so that respective ones of the triangles can be switched to different shades or colours for example. Similarly to above, such regularly patterned tiles can be arranged into an array of tiles.

In the examples of FIGS. 6-8, each patterned component may be composed of a distinct device or an individually addressable portion of a larger device. For example, with reference to FIG. 6, regions 601-603 can be individually configurable whereby to enable the shade, hue or colour of the regions to be modified.

Figure 9:
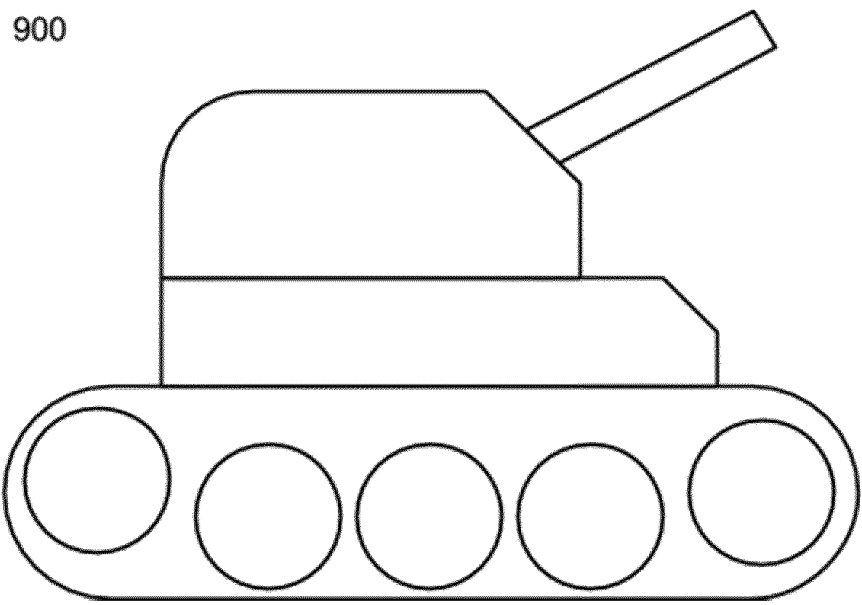
FIGS. 9a-c are schematic representations of a camouflaged platform according to an example.
Figure 9:
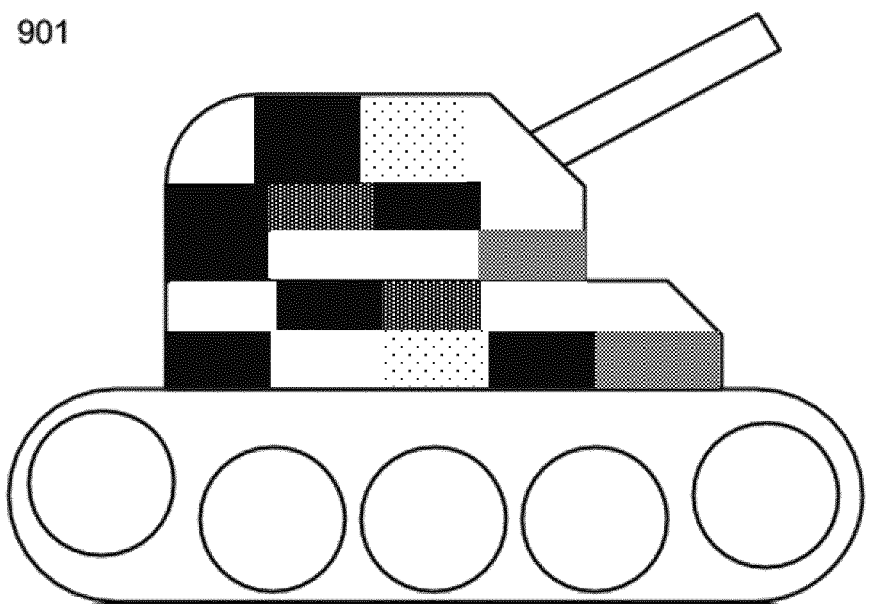
Figure 9:
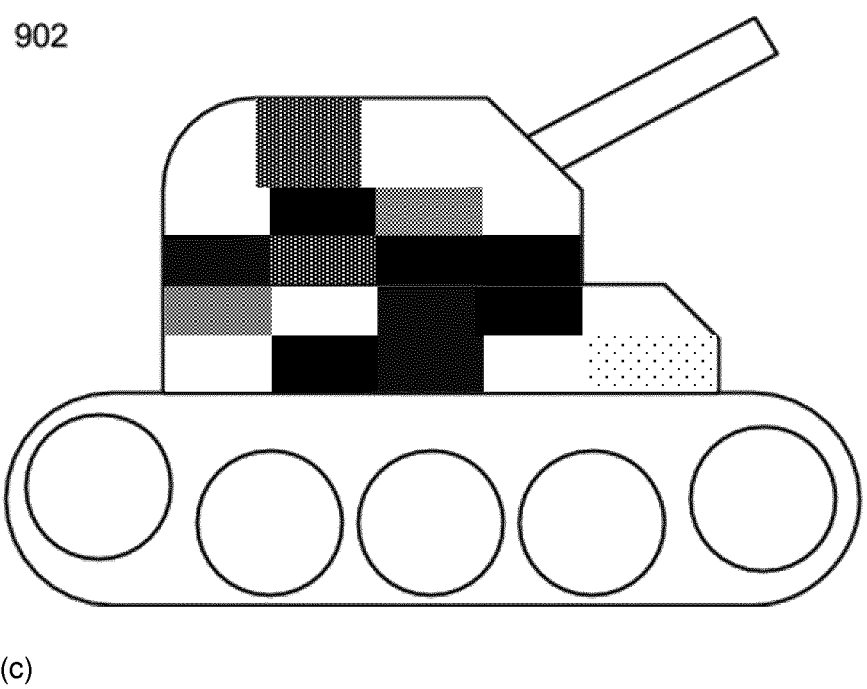

FIGS. 9a-c are schematic representations of a camouflaged platform according to an example. In the example of FIGS. 9a-c, a tank (900) is depicted, although it will be appreciated that any vehicle could be considered, and in fact the platform of FIG. 9 could also be an individual or any other object, and the depiction of a tank is not intended to be limiting but is shown merely for the purposes of illustration and providing an example. The platform 900 of FIG. 9 can have tiles affixed, attached or otherwise provided on the surface, with the tiles shaped and sized appropriately (901). The tiles can be switched between multiple shades or colours to better match the background (902).

There are also examples where it is desirable to render at least part of a platform highly visible, to aid identification of friendly forces. The platform may be rendered visible to the naked eye, or at particular nonvisible (such as IR) wavelengths. The colour and pattern can be used to identify genuine friendly forces for example. The pattern and colours could be agreed in advance and may change with time or location. Likewise, identity may be confirmed by displaying a pre-agreed sequence of colours or patterns.

Figure 10:
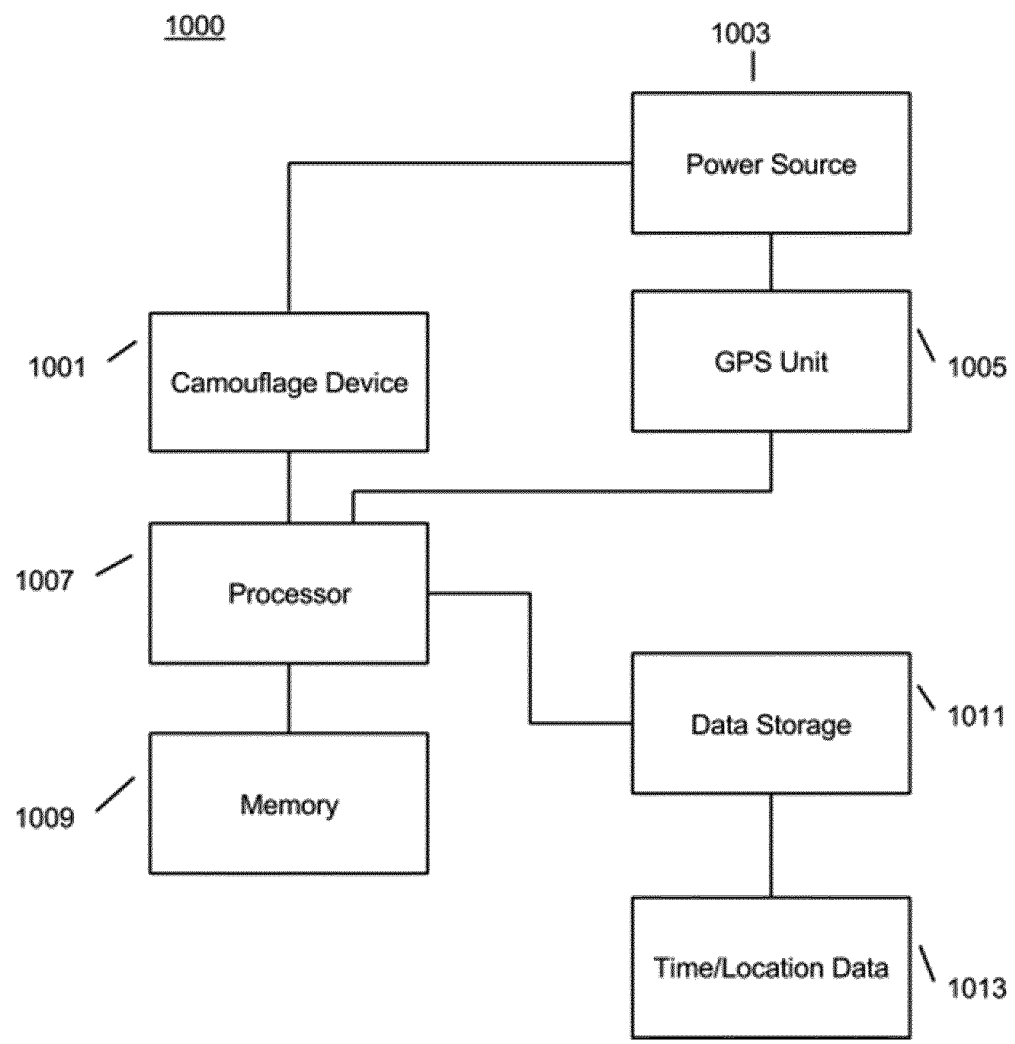
FIG. 10 is a schematic representation of a system according to an example.

FIG. 10 is a schematic representation of a system according to an example. The system 1000 of FIG. 10 includes a camouflage device 1001 such as a tile or array of tiles as described above. Respective ones of the tiles can be composed from one or more layers as described above with reference to FIG. 1 or 2 for example. Device 1001 is powered by a power source 1003, which can be any suitable source such as a renewable energy source as described above or a battery or battery pack or a generator or a power supply from the platform for example. A GPS (or similar) unit 1005 can be provided, which is operable to receive a GPS signal which can be used to determine the position of the unit 1005 and thus system 1000 as is typically known. A processor 1007 is provided and can receive data from GPS unit 1005 and can be used to switch device 1001 into one or more states as described above. For example, the processor can be used to switch the colour and/or shade of respective ones of tiles of an array or parts of a tile of an array and so on of device 1001. In an example, the processor 1007 can use a memory 1009 such as a random access memory device and a data storage device 1011 such as a solid state storage device. Time and location data 1013 can be stored in device 1011, and can provide multiple preset or predetermined data items that can map times and/or locations to specific patterns of shades or colours or any such suitable combination for one or more tiles in an array or patterned parts of one or more tiles of the device 1001. The location data can be in the form of an area or volume, such that a given region, such as on the ground or within a predetermined three-dimensional region can be mapped to specific patterns of shades or colours or any such suitable combination for one or more tiles in an array or patterned parts of one or more tiles of the device 1001.

For example, entry of the system in a given location or region can be recognised by processor 1007, which can periodically query the data storage device 1011 to determine if a current position as derived using data from the GPS unit 1005 is a location stored by data 1013 or is otherwise a location within a given region or volume stored in data 1013. In the event that it is, the processor 1007 can cause the device 1001 and more particularly one or more tiles and/or regions of, for example, multiple patterned tiles and so on arranged on a platform to be configured accord to a preset stored in data 1013 and associated with the location in question. For example, the device 1001 can be configured into a certain type of camouflage for a given region or location, which can be changed as the system and an associated platform leaves the region, and so on. Similar considerations can apply in respect of time data 1013, and the system can be used to configure the device 1001 at specific times as well as or instead of locations.

Figure 11:
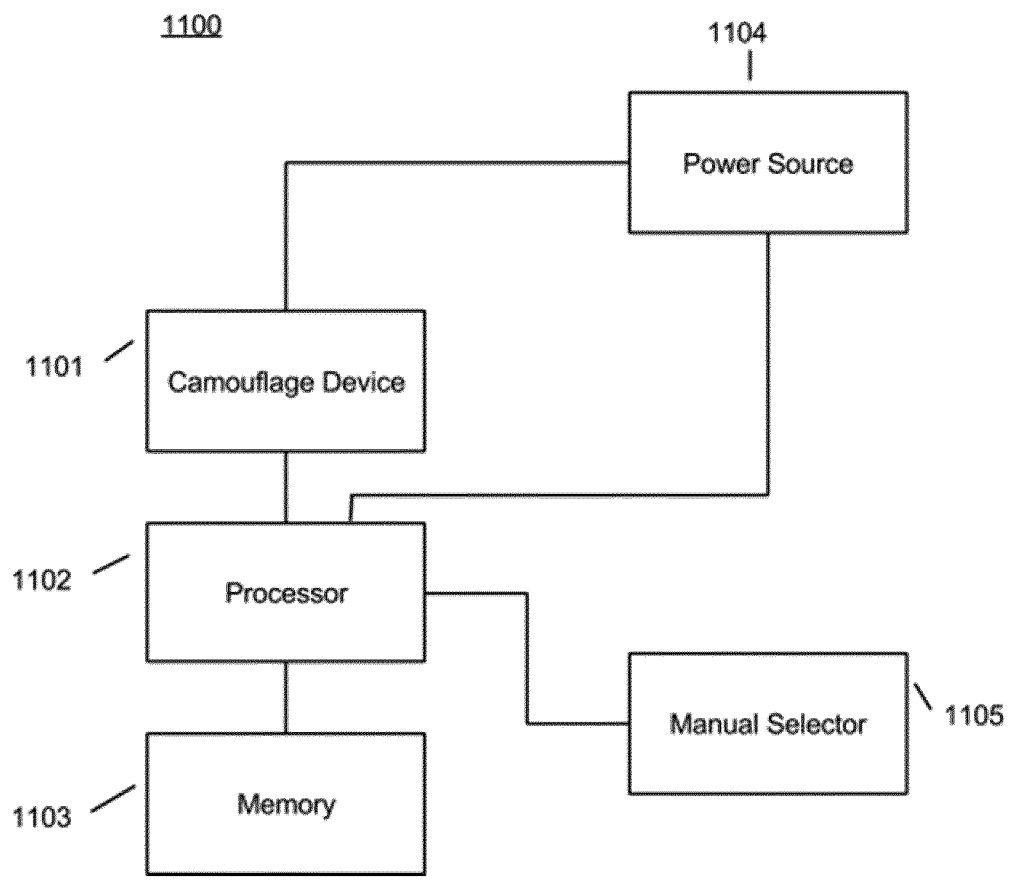
FIG. 11 is a schematic representation of a system according to an example.

FIG. 11 is a schematic representation of a system according to an example. The system 1100 of FIG. 11 includes a camouflage device 1101 such as a tile or array of tiles as described above. Respective ones of the tiles can be composed from one or more layers as described above with reference to FIG. 1 or 2 for example. Device 1101 is powered by a power source 1104, which can be any suitable source such as a renewable energy source as described above or a battery or battery pack or a generator or a power supply from the platform for example. A processor 1102 may be used to interpret a manual input from an appropriate selection device 1105 to provide patterns of colour, hue and brightness on the camouflage device 1101. These may map input selections such as 'rural', 'urban' or 'desert' for example into appropriate stored camouflage patterns. In an example, the processor 1102 can use a memory 1103 such as a flash non-volatile memory to store such configurations of patterns.

Figure 12:
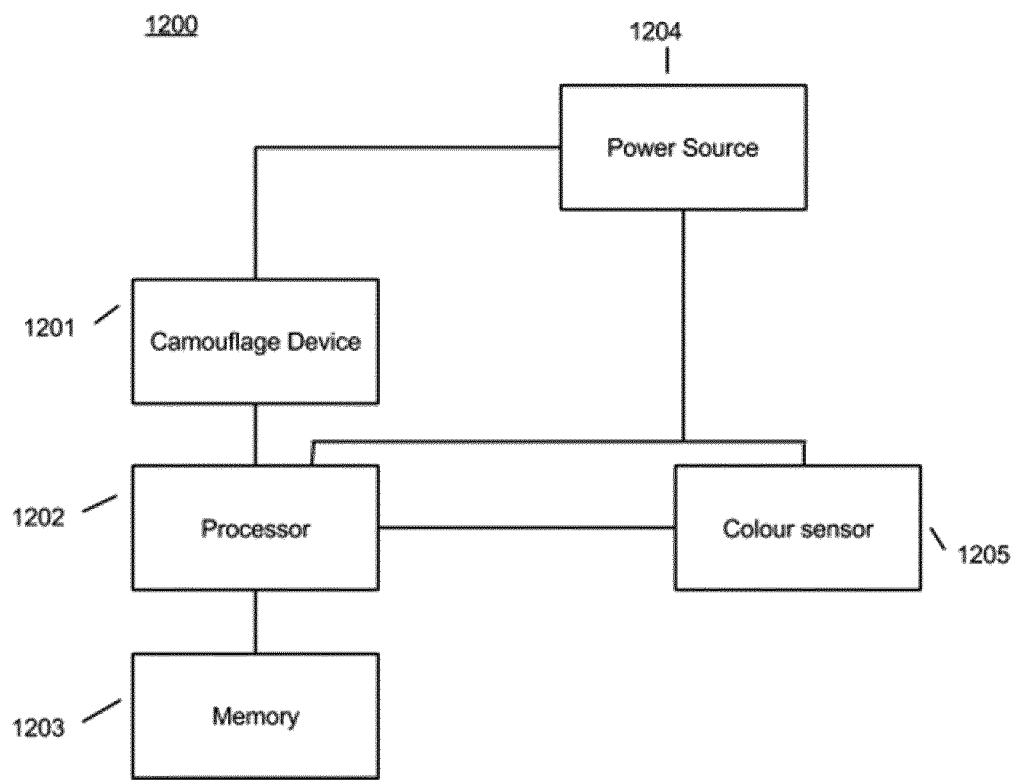
FIG. 12 is a schematic representation of a system according to an example.

FIG. 12 is a schematic representation of a system according to an example. The system 1200 of FIG. 12 includes a camouflage device 1201 such as a tile or array of tiles as described above. Respective ones of the tiles can be composed from one or more layers as described above with reference to FIG. 1 or 2 for example. Device 1201 is powered by a power source 1204, which can be any suitable source such as a renewable energy source as described above or a battery or battery pack or a generator or a power supply from the platform for example. A sensor 1205 capable of imaging and processing information from a nearby scene or environment can be used to provide image data representing the scene or environment, or a portion thereof, or a processed version thereof (such as to determine edges, content, salient portions, people or objects and so on, as known in the art) to a processor 1202. The processor 1202 can provide patterns of colour, hue and brightness for the camouflage device 1201. These patterns can be selected to match, or contrast the surrounding scene in an automatic fashion. For example, if the scene, as imaged using sensor 1205, is determined to be of an urban environment, with multiple buildings and so on, the processor can select a preconfigured pattern for a platform in that environment so that the platform matches or contrasts, as desired. In an example, features in image data generated using device 1205 can be determined using feature matching techniques as typically known. In an example, the processor 1102 can use a memory 1103 such as a flash non-volatile memory to store such configurations of patterns.

Figure 13:
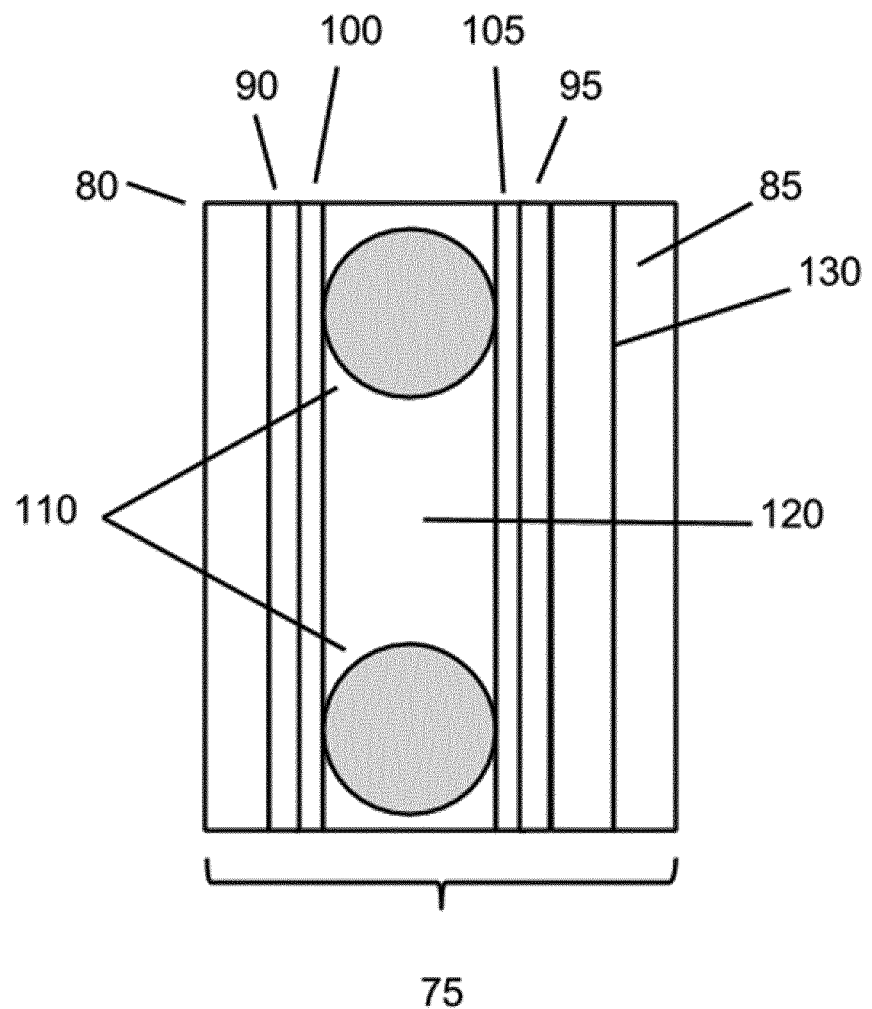
FIG. 13 is a schematic representation of a cross-sectional view of a portion of a plastic camouflage device according to an example.

FIG. 13 is a schematic representation of a cross-sectional view of a portion of a plastic camouflage device according to an example. The device 75 includes two transparent plastic substrates 80, 85. On the inner surface of one of these substrates is reflector 130. The reflector can be made using a number of techniques known in the art. For example, it may be a metallic film coated directly onto the substrate, or it may be a separate layer adhered to the substrate for example. The reflector 130 diffusely reflects light. This can be achieved for example by texturing the metallic surface or roughening the inner surface of substrate 85 before applying a metallic film. In use, the camouflage device 75 can be attached to the platform with the substrate 85 in contact with the surface of the platform. The top surface is therefore the outer surface of substrate 80. Light is incident on that layer, passes through the other layers and is reflected by the reflector 130, back through the other layers and out to the environment. In this example the light does not have to travel through substrate 85, so this substrate may be transparent, semi-transparent or opaque. In an example, the reflector 130 is metallic and maybe patterned such as to obviate the need for the transparent conductor 95.

Figure 14:
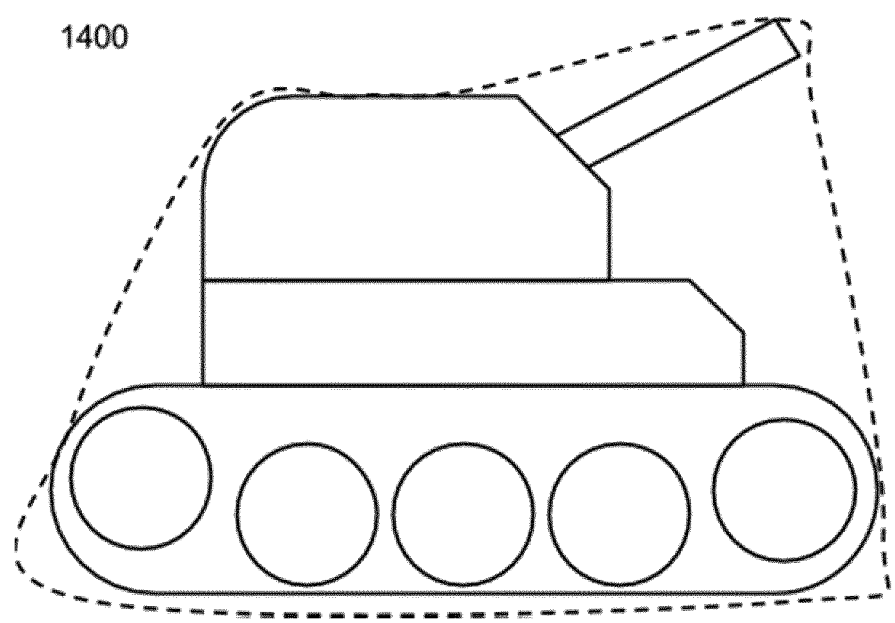
FIG. 14 is a schematic representation of a platform covered with a camouflage net with an array of tiles according to an example.

FIG. 14 is a schematic representation according to an example of a camouflage net placed over a platform in the form of a tank. The dashed line shows the outline of the net. The net includes multiple plastic camouflage devices as provided herein, with flexible linkages between them, so that the net can drape over an object (which in this case is a tank).

Figure 15:
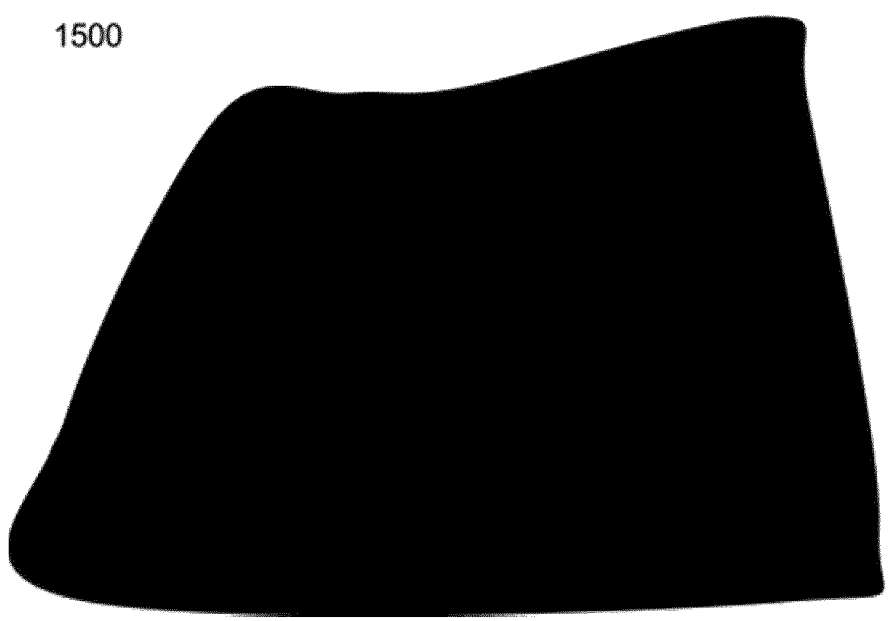
FIG. 15 is a schematic representation of the appearance of a platform covered with a camouflage net with an array of tiles switched to the same colour according to an example.

FIG. 15 shows the view from outside the net when all the tiles that comprise the net are switched to the same colour.

Figure 16:
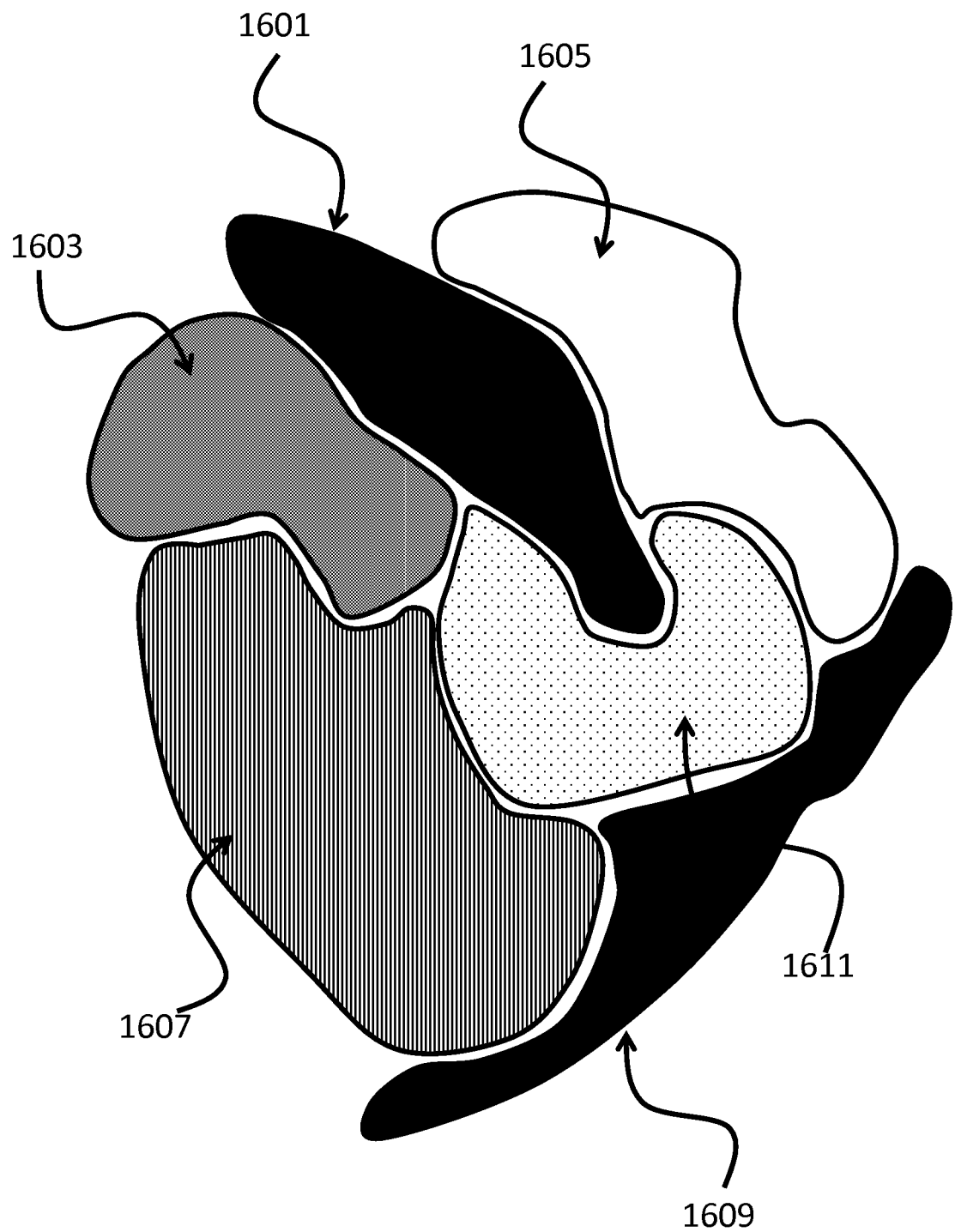
FIG. 16 is a schematic representation of a portion of a camouflage pattern according to an example.

FIG. 16 is a schematic representation of an array of tiles forming a camouflage pattern according to an example. In the example of FIG. 16, multiple regions 1601-1611 are arranged adjacent to one another in order to form a camouflage pattern and each of the regions can be switched/ modified to different shades or colours for example. The tile colours can be selected to enable specific colour combinations to be selected to enable useful colour gamuts for camouflage purposes.

The invention claimed is:

1. An adaptive camouflage device comprising:
   at least one non-emissive guest-host liquid crystal (GHLC) layer configured to switch between a plurality of states in response to a control signal applied by a controller;
   a transparent substrate located in front of the at least one GHLC layer; and
   a reflector layer located behind the at least one GHLC layer;
   the adaptive camouflage device being configured to adaptively match a surrounding environment so as to conceal or disguise a protected object or individual.

2. An adaptive camouflage device as claimed in claim 1, wherein the reflector layer is configured to be diffusely reflective.

3. An adaptive camouflage device as claimed in claim 1, wherein over at least a portion of the device, the reflector layer is partially transparent or the device is devoid of the reflector layer, and wherein the portion is mounted over a window, or other transparent or semitransparent opening, lens, or sensor.

4. An adaptive camouflage device as claimed in claim 1, wherein the or each GHLC layer is operable to be switched between multiple colours or hues.

5. An adaptive camouflage device as claimed in claim 4, wherein at least one of the colours or hues is outside the visible spectrum.

6. An adaptive camouflage device as claimed in claim 4, wherein one of the colours or hues is in the infra-red region of the spectrum.

7. An adaptive camouflage device as claimed in claim 1, further including a filter layer.

8. An adaptive camouflage device as claimed in claim 7, wherein the filter layer is operable to absorb part of the visible or infra-red spectrum, whereby to tint the camouflage device.

9. An adaptive camouflage device as claimed in claim 1, wherein the device is curved.

10. An adaptive camouflage device as claimed in claim 1, further including a renewable energy source operable to supply energy for the device.

11. An adaptive camouflage device as claimed in claim 10, wherein the renewable energy source includes one or more photo-voltaic (PV): panels integrated with or otherwise integral to the device.

12. An adaptive camouflage device as claimed in claim 1, wherein the device is operable to harvest energy from excess heat generated by a platform to which the device is mounted, attached or affixed.

13. An adaptive camouflage device as claimed in claim 1, wherein the device is operable to be switched between preset patterns by an operator or automatically.

14. An adaptive camouflage system comprising:
   a camouflage device that includes at least one non-emissive guest-host liquid crystal (GHLC) layer, said camouflage device being adapted for application to a protected object or individual, a transparent substrate located in front of the at least one GHLC layer, and a reflector layer located behind the at least one GHLC layer; and
   a controller configured to apply electrical voltages to the GHLC layer that switch the GHLC layer between a plurality of states, thereby causing the GHLC layer to adaptively match a surrounding environment, so as to conceal or disguise the protected object or individual.

15. An adaptive camouflage system, comprising: one or more of an adaptive camouflage device according to claim 1, wherein the one or more devices are stacked or arranged adjacent to one another whereby to form a composite device capable of forming a camouflage pattern.

16. An adaptive camouflage system as claimed in claim 15, further comprising: an imaging device operable to detect at least one of a scene, background, colour, brightness and hue of at least a portion of an environment in which the system is positioned and to generate data representing the same; and an image analysis operable to process the data and select on the basis of at least one of the scene, background, colour, brightness and hue, at least one of a colour, hue, brightness and pattern for one or more of the devices.

17. An adaptive camouflage system as claimed in claim 15, further comprising a location detecting apparatus and a system operable to process the data and select on the basis of location, at least one of the colour, hue, brightness and pattern for the devices.

18. An adaptive camouflage system as claimed in claim 15, wherein respective ones of the devices of the system include a GHLC layer including respective different dyes or dye mixtures.

19. An adaptive camouflage system as claimed in claim 15, wherein respective ones of the devices of the system are individually controllable.

20. An adaptive camouflage system as claimed in claim 15, wherein at least one of the devices of the system includes a GHLC layer including a dye or dye mixture operable to absorb light outside of the visible part of the spectrum.

21. A camouflage apparatus, comprising: multiple tile regions arranged adjacent to one another to form a camouflage pattern for the apparatus, respective ones of the tile regions comprising a device according to claim 1, wherein respective ones of the tile regions are switchable between the multiple states whereby to alter or adjust a colour or hue of the regions.

* * * * *

UNITED STATES PATENT AND TRADEMARK OFFICE
CERTIFICATE OF CORRECTION

PATENT NO. : 10,767,965 B2
APPLICATION NO. : 15/528423
DATED : September 8, 2020
INVENTOR(S) : Stephen Kitson et al.

It is certified that error appears in the above-identified patent and that said Letters Patent is hereby corrected as shown below:

In the Claims

Column 13, Line 11: "an image analysis" should read "an image analysis system"

Signed and Sealed this
Seventh Day of March, 2023

Katherine Kelly Vidal
*Director of the United States Patent and Trademark Office*